(12) United States Patent
Ishikawa et al.

(10) Patent No.: US 7,402,919 B2
(45) Date of Patent: Jul. 22, 2008

(54) CONTROL DEVICE FOR MOTOR-DRIVEN 4WD VEHICLE AND RELATED METHOD

(75) Inventors: Yasuki Ishikawa, Tokyo (JP); Tadaaki Iiyama, Isehara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 252 days.

(21) Appl. No.: 10/995,348

(22) Filed: Nov. 24, 2004

(65) Prior Publication Data
US 2005/0116680 A1  Jun. 2, 2005

(30) Foreign Application Priority Data
Nov. 27, 2003 (JP) .............................. 2003-397304

(51) Int. Cl.
*B60L 1/00* (2006.01)
(52) U.S. Cl. ................. 307/10.1; 318/440; 318/800; 318/808; 318/812; 290/40 C
(58) Field of Classification Search ......... 318/440–442, 318/800, 801, 803, 805, 808, 812; 290/40 C; 307/10.1
See application file for complete search history.

(56) References Cited

U.S. PATENT DOCUMENTS

| | | | |
|---|---|---|---|
| 6,066,928 A | 5/2000 | Kinoshita et al. | |
| 6,630,804 B2 * | 10/2003 | Moriya et al. | 318/85 |
| 6,930,460 B2 * | 8/2005 | Ishikawa et al. | 318/442 |
| 2001/0019210 A1 * | 9/2001 | Fukasaku et al. | 290/40 C |
| 2003/0057908 A1 | 3/2003 | Kusaka et al. | |
| 2003/0146726 A1 | 8/2003 | Ishikawa et al. | |

FOREIGN PATENT DOCUMENTS

| | | |
|---|---|---|
| EP | 1 138 539 A2 | 10/2001 |
| JP | 2002-152911 A | 5/2002 |
| JP | 2002-200932 A | 7/2002 |

OTHER PUBLICATIONS

U.S. Appl. No. 10/995,317, filed Nov. 24, 2004, Ishikawa et al.

* cited by examiner

*Primary Examiner*—Michael J Sherry
*Assistant Examiner*—Tien Mai
(74) *Attorney, Agent, or Firm*—Foley & Lardner LLP

(57) ABSTRACT

A control device controlling a motor-driven four wheel drive vehicle, where either of front wheels and rear wheels are driven by an engine and the others are driven by an AC motor, is provided with an electric power generator driven by an engine to generate first three-phase AC power, a rectifier rectifying the first three-phase AC power, generated by the electric power generator, to second DC power and supplying the second DC power to a neutral point of the AC motor; and a first step-up and step-down inverter stepping up and converting the second DC power, supplied through the neutral point, to third three-phase AC power. The AC motor is rotationally driven by application of the third three-phase AC power from the first step-up and step-down inverter.

13 Claims, 7 Drawing Sheets

FIG. 5

| MODE | ALT | FR INV | BAT | RR INV | MOT | OPERATION |
|---|---|---|---|---|---|---|
| ENG START | MOT | PWR | DISCH | STOP | STOP | · ACTUATE ALT AND START ENG |
| BAT CHG | ALT | REGEN | CHG | STOP | STOP | · GENERATE WITH ALT<br>· REGENERATE WITH FR INV AND CHARGE BAT |
| 4WD | ALT | REGEN | DISCH | PWR | DR | · GENERATE WITH ALT<br>· REGENERATE WITH FR INV AND SUPPLY PWR TO RR INV<br>· DRIVE MOT WITH RR INV |

FIG.7

| MODE | ALT | INV | MOT | OPERATION |
|---|---|---|---|---|
| 4WD | ALT | PWR | DR | • GENERATE WITH ALT<br>• DRIVE MOT WITH RR INV |

CONTROL DEVICE FOR MOTOR-DRIVEN 4WD VEHICLE AND RELATED METHOD

CROSS-REFERENCE TO RELATED PATENT APPLICATIONS

Japan Priority Application 2003-397304, filed Nov. 27, 2003 including the specification, drawings, claims and abstract, is incorporated herein by reference in its entirety.

BACKGROUND OF THE INVENTION

The present invention relates to a control device for a motor-driven four wheel drive vehicle and its related method and, more particularly, to a control device and a control method for a motor-driven four wheel drive vehicle wherein either of front wheels and rear wheels are driven by an engine and the others are driven by an AC motor depending upon needs.

Japanese Patent Application Laid-Open Publication Nos. 2002-152911 and 2002-200932 disclose four wheel drive vehicles wherein front wheels are driven with drive power, generated from an engine, by which an electric power generator is driven to generate electric power which in turn rotationally drives a motor to provide drive power by which rear wheels are driven.

SUMMARY OF THE INVENTION

However, upon studies conducted by the present inventors, with such a structure, since a voltage generated by the electric power generator is applied to a rear wheel motor and the voltage for driving the motor is a voltage generated by the electric power generator, a size of the motor for driving the rear wheels tends to depend on an electric power generating capacity of the electric power generator. That is, it is conceivable that with less electric power being generated by the electric power, a need arises for increasing a motor winding in order for the motor to provide desired power output causing the motor to result in a large size.

The present invention has been completed with the above view in mind and has an object to provide a control device and a control method, for a motor-driven four wheel drive vehicle, which even with less electric power being generated by an electric power generator, are able to reliably drive a motor.

To achieve the above object, in one aspect of the present invention, there is provided a control device controlling a motor-driven four wheel drive vehicle where either of front wheels and rear wheels are driven by an engine and the others are driven by an AC motor, comprising: an electric power generator driven by an engine to generate first three-phase AC power; a rectifier rectifying the first three-phase AC power, generated by the electric power generator, to second DC power and supplying the second DC power to a neutral point of the AC motor; and a first step-up and step-down inverter stepping up and converting the second DC power, supplied through the neutral point, to third three-phase AC power, the AC motor being rotationally driven by application of the third three-phase AC power from the first step-up and step-down inverter.

On the other hand, in another aspect of the present invention, there is provided a control method controlling a motor-driven four wheel drive vehicle where either of front wheels and rear wheels are driven by an engine and the others are driven by an AC motor, comprising: generating first three-phase AC power utilizing rotational motion of an engine; rectifying the first three-phase AC power to second DC power; stepping up and converting the second DC power, supplied through a neutral point of the AC motor, to third three-phase AC power; and applying the third three-phase AC power resulting from being stepped up and converted to the AC motor to rotationally drive the AC motor.

Other and further features, advantages, and benefits of the present invention will become more apparent from the following description taken in conjunction with the following drawings.

BRIEF DESCRIPTION OF THE DRAWINGS

FIG. 5 is a view in which operating conditions of various component parts, forming the control device of the motor-driven four wheel drive vehicle of the presently filed embodiment, are summarized;

FIG. 7 is a view in which operating conditions of various component parts, forming the control device of the motor-driven four wheel drive vehicle of the presently filed embodiment, are summarized.

DETAILED DESCRIPTION OF THE PREFERRED EMBODIMENTS

Figure 1:
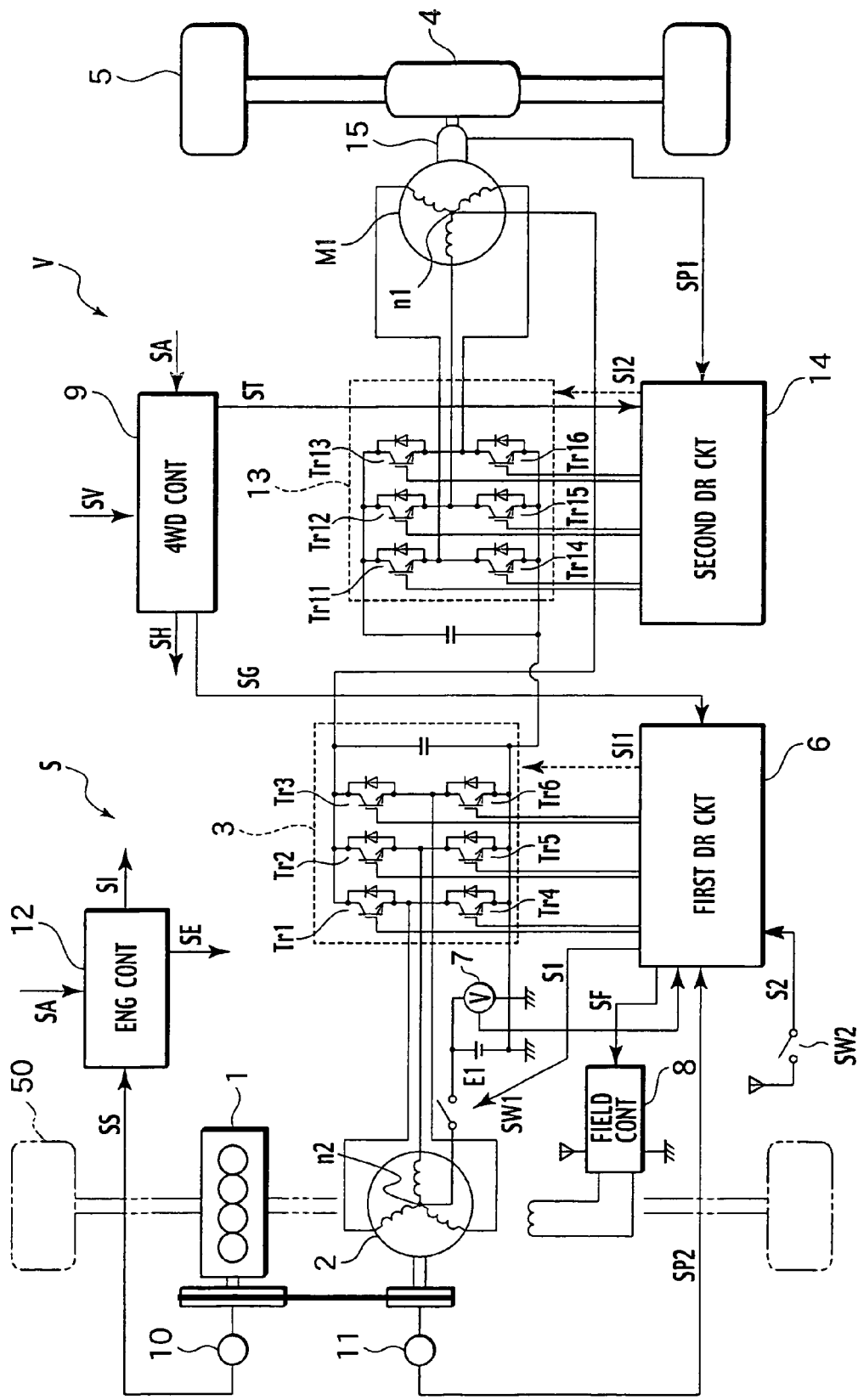
FIG. 1 is a block diagram illustrating a structure of a control device for a motor-driven four wheel drive vehicle of a first embodiment according to the present invention.

Hereinafter, control devices and related control methods for motor-driven four wheel drive vehicles of various embodiments according to the present invention are described with suitable reference to the accompanying drawings. Incidentally, throughout various embodiments, like component parts bear like reference numerals to suitably simplify or omit description.

First Embodiment

First, description is made of a first embodiment according to the present invention.

FIG. 1 is a block diagram showing a structure of a control device S of a motor-driven four wheel drive vehicle of the presently filed embodiment.

The control device S of the presently filed embodiment may be sufficed to be of a type that controls a vehicle V with a structure wherein in principle, either of front wheels 50 and rear wheels 5 are driven by an engine and the others are driven by a motor.

Typically, as shown in FIG. 1, the vehicle V is comprised of an engine 1, an alternator 2 (a 42V alternator: electric power generator) driven by rotational power of the engine 1 to generate three-phase AC power (first three-phase AC power: approximate maximum power of 4 kW and voltage within a range of 11 to 42 Vrms), a battery E1 (a 14V battery) that supplies electric power to a variety of instrumented equipments installed on the vehicle, and a three-phase AC motor M1 for driving rear wheels 5 connected to a differential gear 4.

Further, the control device S is comprised of a front step-up and step-down inverter 3, a first driver circuit 6, a rear step-up and step-down inverter 13, a second driver circuit 14, a four wheel drive controller 9 and an engine controller 12 and, additionally, includes an engine speed sensor 10 that detects rotational speed of the engine 1, a position sensor 11 for detecting a rotational position of the 42V alternator 2, a voltage sensor 7 connected in parallel to the 14V battery E1 for detecting a charging voltage of the 14V battery E1, and a field controller 8 for controlling electric current flowing across a field winding of the 42V alternator 2.

More particularly, the control device S includes the front step-up and step-down inverter 3, which allows the three-phase AC power (first three-phase AC power) generated by the 42V alternator to be rectified and converted to DC power (second DC power: approximate maximum power of 4 kW and voltage within a range of 16 to 60V) to generate three-phase AC power (third AC power: approximate maximum power of 4 kW and voltage within a range of 22 to 42 Vrms) for driving the three-phase AC motor M1, while cooperating with the rear step-up and step-down inverter 13, which will be described below. Further, the front step-up and step-down inverter 3 converts DC power (fourth DC power: approximate maximum power of 1 kW and voltage of 14V) discharged from the 14V battery E1 into three-phase AC power while concurrently causing three-phase AC power to be stepped up to allow the same to be supplied to the 42V alternator 2 (resultant three-phase AC power corresponds to fifth AC power: approximate maximum power of 1 kW and voltage of 20 Vrms) and, also, rectifies and converts three-phase AC power, generated by the 42V alternator, into DC power for rectification while concurrently causing DC power to be stepped down to provide electric power that is to be charged in the 14V battery E1 (resultant DC power corresponds to sixth DC power: approximate maximum power of 1 kW and voltage of 14 V).

The front step-up and step-down inverter 3 includes six pieces of switching elements Tr1 to Tr6 such as IGBTs (Insulated Gate Bipolar Transistors) or MOS-FETs (Metal-Oxide-Silicone Field Effect Transistors). The respective switching elements Tr1 to Tr6 have control input terminals that are applied with NO/OFF signals SI1 such that the switching elements Tr1 to Tr6 are turned on or turned off for thereby achieving rectifying operation to convert AC power to DC power or vice versa. A negative output terminal of the front step-up and step-down inverter 3 is connected to a negative terminal of the 14V battery E1 whose positive terminal is connected to a neutral point n2 of the 42V alternator via a switch SW1.

The four wheel drive controller 9 is responsive to an accelerator pedal's actuation signal SA outputted from an accel sensor (not shown) and a vehicle-wheel speed signal SV resulting from a vehicle-wheel speed sensor (not shown) for discriminating whether to perform four wheel drive. On discriminating that four wheel drive is to be performed, the four wheel drive controller 9 delivers a torque command signal ST to the second driver circuit 14 while delivering a power-generation command signal SG to the first driver circuit 6.

An engine controller 12 is responsive to a detection signal SS, resulting from the engine speed sensor 10 mounted to the engine 1, and a detection signal SA of the accel sensor (not shown) to deliver ignition signals SI to igniters (not shown) of the engine 1 while delivering injection valve signals SE to injection valves (not shown).

In response to a charging voltage of the 14V battery E1 detected by the voltage sensor 7, a rotational position detection signal SP2 of the 42V alternator 2 detected by the position sensor 11, a turn-on or turn-off signal S2 resulting from an accelerator switch SW2 and the power-generation command signal SG from the four wheel drive controller 9, the first driver circuit 6 generates ON/OFF signals SI1 that are applied to the control input terminals of the switching transistors Tr1 to Tr6 that in turn are controlled for turning on or turning off while outputting a field control signal SF to the field controller 8 and outputting the ON/OFF signals S1 to the switch SW1. Incidentally, the accelerator switch SW2 serves as a switch for start-up of the engine and may include merely an ignition switch.

Connected to the front step-up and step-down inverter 3 in a subsequent stage thereof is the rear step-up and step-down inverter 13. A negative side of a DC output terminals of the front step-up and step-down inverter 3 is connected to a negative side of DC input terminal of the rear step-up and step-down inverter 13. The rear step-up and step-down inverter 13 includes six pieces of switching elements Tr11 to Tr16 such as IGBTs and MOS-FETs. The respective switching elements Tr11 to Tr16 have control input terminals that are applied with NO/OFF signals SI2 such that the switching elements Tr11 to Tr16 are turned on or turned off for thereby converting the DC power (second DC power) to the three-phase AC power (third three-phase AC power) while stepping up the voltage. Incidentally, it may be probable for the front step-up and step-down inverter 3 to be referred to as a second step-up and step-down inverter and the rear step-up and step-down inverter 13 as a first step-up and step-down inverter.

The second driver circuit 14 is responsive to a detection signal SP1 of the position sensor 15, mounted to an output shaft of the three-phase AC motor M1, and the torque command signal ST outputted from the four wheel drive controller 9 to apply ON/OFF signals SI2 to control input terminals of the switching elements Tr11 to Tr16 of the rear step-up and step-down inverter 13 for controlling ON/OFF states of the respective switching elements Tr11 to Tr16.

The neutral point n1 of the three-phase motor M1 is connected to a positive side of the DC power terminals of the front step-up and step-down inverter 3. Also, the output shaft of the three-phase motor M1 is connected to rear wheels 5 through the differential gear 4 for delivering rotational power of the three-phase motor M1 to the rear wheels 5. Incidentally, the rotational power of the engine 1 is transferred to the front wheels 50.

Now, a basic sequence of operations of the control device of the motor-driven four wheel drive vehicle of the presently filed embodiment is described below in connection with engine start-up, four wheel drive and charging of the 14V battery. Incidentally, respective operations of the 42V alternator 2, the front step-up and step-down inverter 3, 14V battery E1, the rear step-up and step-down inverter 13 and the three-phase AC motor M1 on respective operating modes are collectively shown in FIG. 5.

Operation at Engine Start-Up Mode

First, description is made of operations in a start-up mode of the engine 1.

Figure 2:
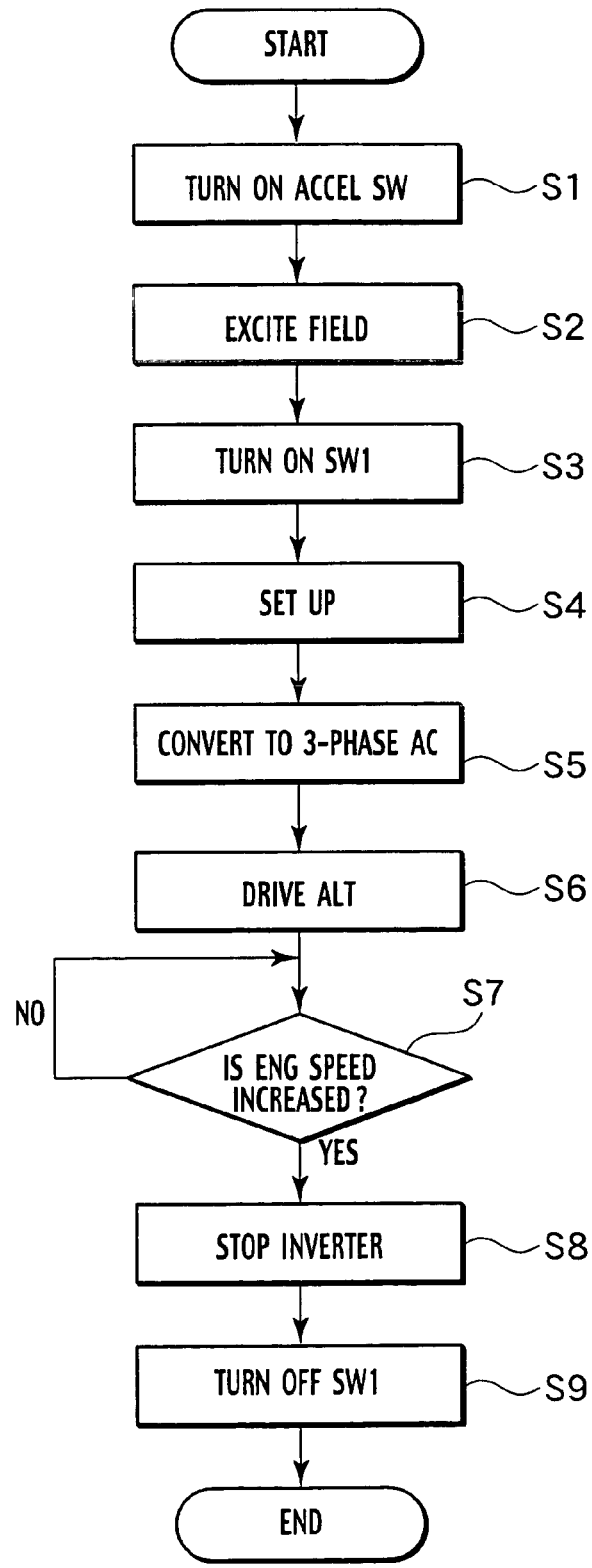
FIG. 2 is a flowchart illustrating a basic sequence of operations of the control device, of the motor-driven four wheel drive vehicle of the presently filed embodiment, during startup of an engine.

FIG. 2 is a flowchart illustrating a basic sequence of operations of the engine at start-up.

As shown in FIG. 2, first in step S1, when a vehicle occupant actuates an accelerator, the accelerator switch SW2 is turned on.

In next step S2, the first driver circuit 6 is responsive to the ON signal S2 to deliver the command signal SF to the field controller 8 for exciting the field wiring of the 42V alternator 2.

In succeeding step S3, the first driver circuit 6 delivers the signal S1 to the switch SW1 that in turn is turned on to provide electrical connection between the neutral point n2 of the 42V alternator 2 and the positive terminal of the 14V battery E1.

This allows DC power, charged in the 14V battery E1, to be applied to the front step-up and step-down inverter 3, and controlling the ON/OFF states of the respective switching elements Tr1 to TR6 under control of the first driver circuit 6 permits DC power of 14 volts to be stepped up to 42 volts in step S4 while converting DC power to three-phase AC power in step S5.

In consecutive step S6, three-phase AC power of 42 volts is supplied to the 42V alternator 2 in response to the rotational position signal SP2 of the 42V alternator 2 delivered from the position sensor 11, thereby rotationally drive the 42V alternator 2. Here, since the 42V alternator 2 is connected to the engine 1, rotational power of the 42V alternator 2 is transferred to the engine 1 which in turn is started up.

In subsequent step S7, the rotational speed of the engine 1 increases and on confirming the start-up of the engine 1, in succeeding step S8, the front step-up and step-down inverter 3 is interrupted to halt the rotation of the 42V alternator 2.

Subsequently, in step S9, the switch SW1 is turned off, terminating a current series of operations.

As set forth above, the DC power charged in the 14V battery E1 is stepped up and converted to three-phase AC power to rotationally drive the 42V alternator 2, whose drive force is enabled to start up the engine 1. That is, in cyclopaedically summarizing, the 42V alternator (ALT) is caused to operate as a motor (MOT) when an operating mode (MODE) lies at engine start-up (ENG START) as shown in FIG. 5. When this takes place, the front step-up and step-down inverter (FR INV) operates in a power running mode (PWR) and the 14V battery (BAT) discharges (DISCH), and the rear step-up and step-down inverter (RR INV) and the three-phase AC motor (MOT) is stopped (STP) to enter into the operation (OPERATION) wherein the 42V alternator 2 is driven with the 14V battery and the front step-up and step-down inverter to achieve engine start-up (ACTUATE ALT AND START ENG).

Operation on Four Wheel Drive Mode

Next, description is made of a basic sequence of operations on a four wheel drive mode.

Figure 3:
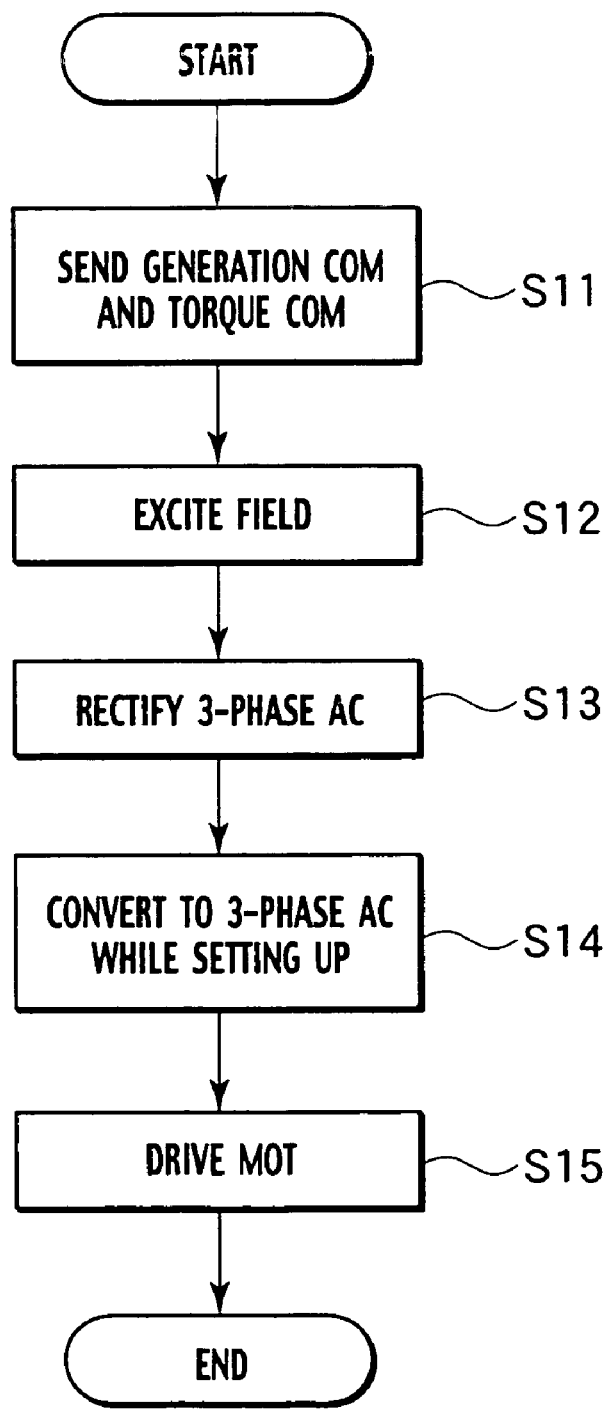
FIG. 3 is a flowchart illustrating a basic sequence of operations of the control device, of the motor-driven four wheel drive vehicle of the presently filed embodiment, during four wheel drive.

FIG. 3 is a flowchart illustrating a basic sequence of operations on the four wheel drive mode.

As shown in FIG. 3, in step S11, the four wheel drive controller 9 is responsive to the vehicle wheel speed SV, resulting from the vehicle wheel speed sensor, and the accel actuation signal SA resulting from the accel sensor to discriminate whether to perform four wheel drive. If discrimination is made that four wheel drive is to be performed, the power-generation command signal SG is delivered to the first driver circuit 6 and the torque command signal ST is delivered to the second driver circuit 14.

In succeeding step S12, the first driver circuit 6 delivers the command signal SF to the field controller 8 for exciting the field winding of the 42V alternator 2. This allows the 42V alternator 2 to operate as an electric power generator and the 42V alternator 2, connected to the engine 1, is supplied with rotational power of the engine 1 to generate three-phase AC power.

Subsequently, such three-phase AC power is supplied to the front step-up and step-down inverter 3 and in step S13, the front step-up and step-down inverter 3 rectifies three-phase AC power into DC power.

In consecutive step S14, under control of the second driver circuit 14, the respective switching elements Tr11 to Tr16 of the rear step-up and step-down inverter 13 are controlled to be turned on or turned off, thereby stepping up DC power delivered from the front step-up and step-down inverter 3 while converting DC power into three-phase AC power.

Next, such three-phase AC power is supplied to the three-phase AC motor M1 and in step S15, three-phase AC motor M1 is rotationally driven in response to the detection signal SP 1 of the position sensor 15.

As previously noted, even if a DC voltage outputted from the front step-up and step-down inverter 3 has a low level, the DC voltage is able to be stepped up to a desired level to be supplied to the three-phase AC motor M1. Rotational power of the three-phase AC motor M1 is transferred to the rear wheels 5 through the differential gear 4, realizing four wheel drive. That is, in cyclopaedically summarizing, the 42V alternator (ALT) is caused to operate as an electric power generator (ALT) when the operating mode (MODE) lies at a four wheel drive as shown in FIG. 5. When this takes place, the front step-up and step-down inverter (FR INV) operates in a regenerative mode (RGEN) and the 14V battery (BAT) discharges (DISCH), and the rear step-up and step-down inverter (RR INV) operates in a power running mode (PWR) to drive (DR) the three-phase AC motor (MOT) in operation (OPERATION) wherein the 42V alternator 2 is caused to generate electric power (GENERATE WITH ALT) and the front step-up and step-down inverter is caused to operate in a regenerative mode while supplying electric power to the rear step-up and step-down inverter (REGENERATE WITH FR INV AND SUPPLY PWR TO RR INV) and causing the rear step-up and step-down inverter to drive the three-phase AC motor (DRIVE MOT WITH RR INV).

Operation in 14V Battery Charging Mode

Next, description is made of a basic sequence of operations in charging the 14V battery E1.

Figure 4:
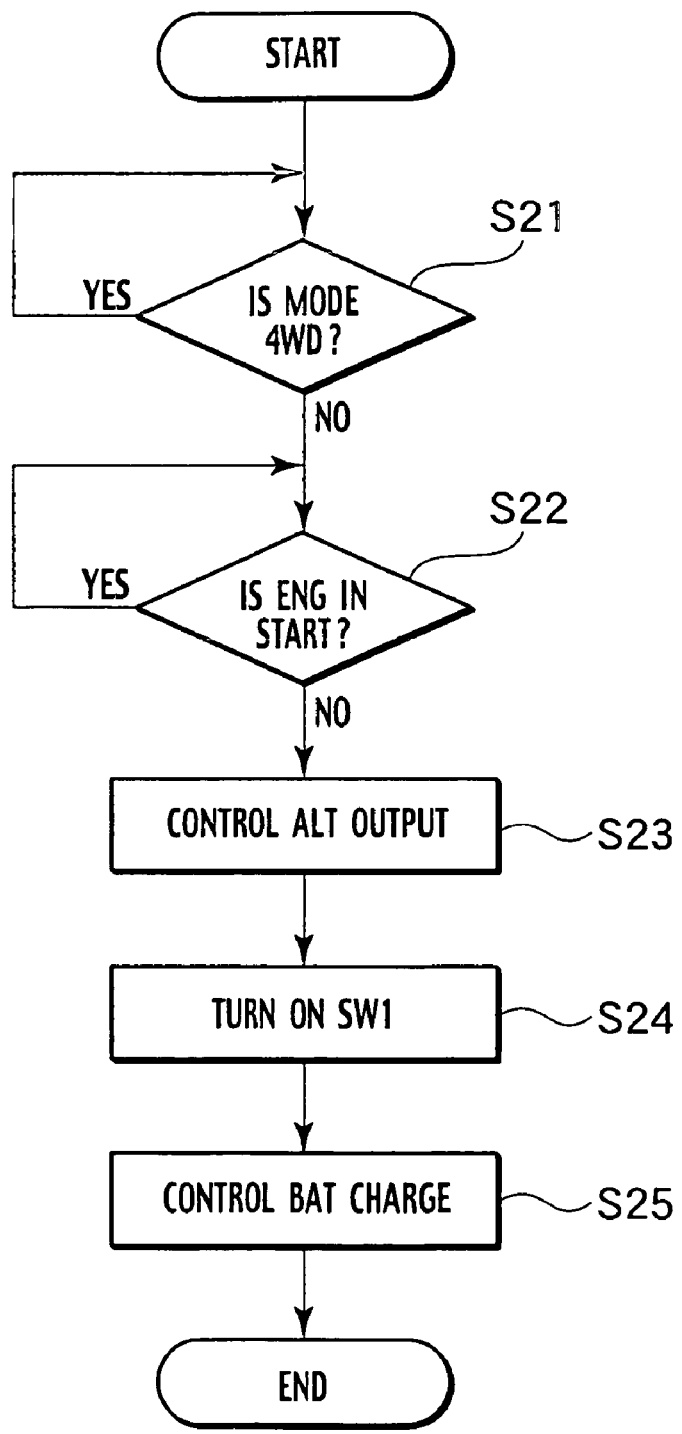
FIG. 4 is a flowchart illustrating a basic sequence of operations of the control device, of the motor-driven four wheel drive vehicle of the presently filed embodiment, during operation in charging a 14V battery.

FIG. 4 is a flowchart illustrating a basic sequence of operations in charging the 14V battery E1.

As shown in FIG. 4, first in step S21, the first driver circuit 6 discriminates to find whether the vehicle remains in the four wheel drive mode, i.e., whether the three-phase AC motor M1 is rotationally driven. In particular, this discrimination is made based on whether the first driver circuit 6 is applied with the power-generation command signal SG.

As a result, if discrimination is made that no four wheel drive is present, in succeeding step S22, discrimination is made to find whether the engine 1 remains in start-up operation. In particular, discrimination is made that the engine 1 remains in start-up operation until start-up of the engine 1 appearing in step S7 during operation of the engine start-up set forth above, and after start-up of the engine 1 has been confirmed, discrimination is made that the start-up operation of the engine 1 is terminated with no presence of start-up operation of the engine 1.

Next, if discrimination is made that no start-up operation of the engine is present, in consecutive step S23, the first driver circuit 6 outputs the command signal SF for exciting the field winding of the 42V alternator 2 and controls the field such that an output voltage of the 42V alternator 2 lies at a value of approximately 14 volts.

Subsequently, in step S24, the first driver circuit 6 turns the switch SW1 on and, in succeeding step S25, controls current for field, flowing to the 42V alternator 2, in response to the detection signal SV of the voltage sensor 7 while causing the front step-up and step-down inverter 3 to operate in the regenerative mode to regulate the voltage, to be applied to the 14V battery E1, to a value of 14 volts for charging the 14V battery E1.

Thus, subject to the vehicle remaining in the absence of four wheel drive and start-up operation, the charging of the 12V-battery E1 is accomplished. That is, in cyclopaedically summarizing, the 42V alternator (ALT) is caused to operate as the electric power generator (ALT) when the operating mode (MODE) lies at a 14V battery charging mode (BAT CHG) as shown in FIG. 5. When this takes place, the front step-up and step-down inverter (FR INV) operates in the regenerative mode (RGEN) to charge (CHG) the 14V battery (BAT), and the rear step-up and step-down inverter (RR INV) is stopped (STOP) to stop the three-phase AC motor (MOT). Under such operation (OPERATION), the 42V alternator 2 generates electric power (GENERATE WITH ALT) while the front step-up and step-down inverter operates in the regenerative mode for charging the 14V battery E1 (REGENERATE WITH FR INV AND CHARGE BAT).

As set forth above, with the control device of the motor-driven four wheel drive vehicle of the presently filed embodiment, due to a capability of using power generated by the 42V alternator 2 commonly for the three-phase AC motor M1 driven by three-phase AC power at the voltage of 42 volts and the 14V battery E1 charged at DC power of a value of 14 volts, no need arises for providing separate electric power generators for respective purposes, enabling a device structure to be simplified. Also, space saving is achieved in an installation space required for the device, enabling reduction in weight and costs.

That is, the presence of a capability of using power generated by a common motor/generator for the AC motor adapted to be supplied with AC power at a given rated voltage to be driven and a battery adapted to be supplied with and charged with DC power at a rated voltage lower than the given rated voltage enables improvement in a freedom in layout, while achieving reduction in weight and costs.

Further, since power generated by the 42V alternator 2 is converted to DC power and, then, stepped up by the rear step-up and step-down inverter 13 to rotationally drive the three-phase AC motor M1 for driving the rear wheels 50, the voltage to be supplied to the three-phase motor M1 can be raised to a voltage of electric power generated by the 42V alternator 2, enabling the AC motor to be miniaturized and lightweight.

That is, since three-phase AC power resulting from the electric power generator is converted into DC power through a rectifying mechanism while stepping up DC power with the first step-up and step-down inverter to provide electric power for driving the AC motor, even in the presence of less electric power generated by the electric power generator, such electric power can be amplified and supplied to the AC motor, enabling the AC motor to be miniaturized and lightweight.

Further, upon provision of the front step-up and step-down inverter 3 in the subsequent stage of the 42V alternator 2 to allow the front step-up and step-down inverter 3 to rectify three-phase AC power generated by the 42V alternator 2 and, additionally, using this front inverter 3 to convert DC power, charged in the 14V battery E1, into three-phase AC power that is outputted to the 42V alternator 2, the 42V alternator 2 can be operated as an electric motor to start up the engine 1 and no need arises for separately providing particular device for start-up of the engine 1, enabling a device structure to be simplified.

That is, the second step-up and step-down inverter is provided in a subsequent stage of the electric power generator to allow the second step-up and step-down inverter to convert three-phase AC power into DC power and during start-up of the engine, DC power charged in the battery is converted to three-phase AC power with the second step-up and step-down inverter to be supplied to the electric power generator to cause the same to operate as the electric motor for thereby starting up the engine, with a resultant no need for separately providing a device for starting up the engine to enable simplification of a device structure.

Further, since three-phase AC power generated by the 42V alternator 2 is stepped down and rectified by the front step-up and step-down inverter to allow resultant DC power to be supplied to the 14V battery E1 to charge the same, electric power for charging the 14V battery E1 can be easily obtained, thereby enabling the 14V battery E1 to be kept at an appropriate charging voltage.

That is, since AC power generated by the electric power generator can be stepped down and rectified by the second step-up and step-down inverter to allow resultant DC power to be charged to the battery, the charging of the battery can be easily attained, enabling charging voltage of the battery to be kept at an appropriate value.

Second Embodiment

Next, description is made of a second embodiment according to the present invention.

Figure 6:
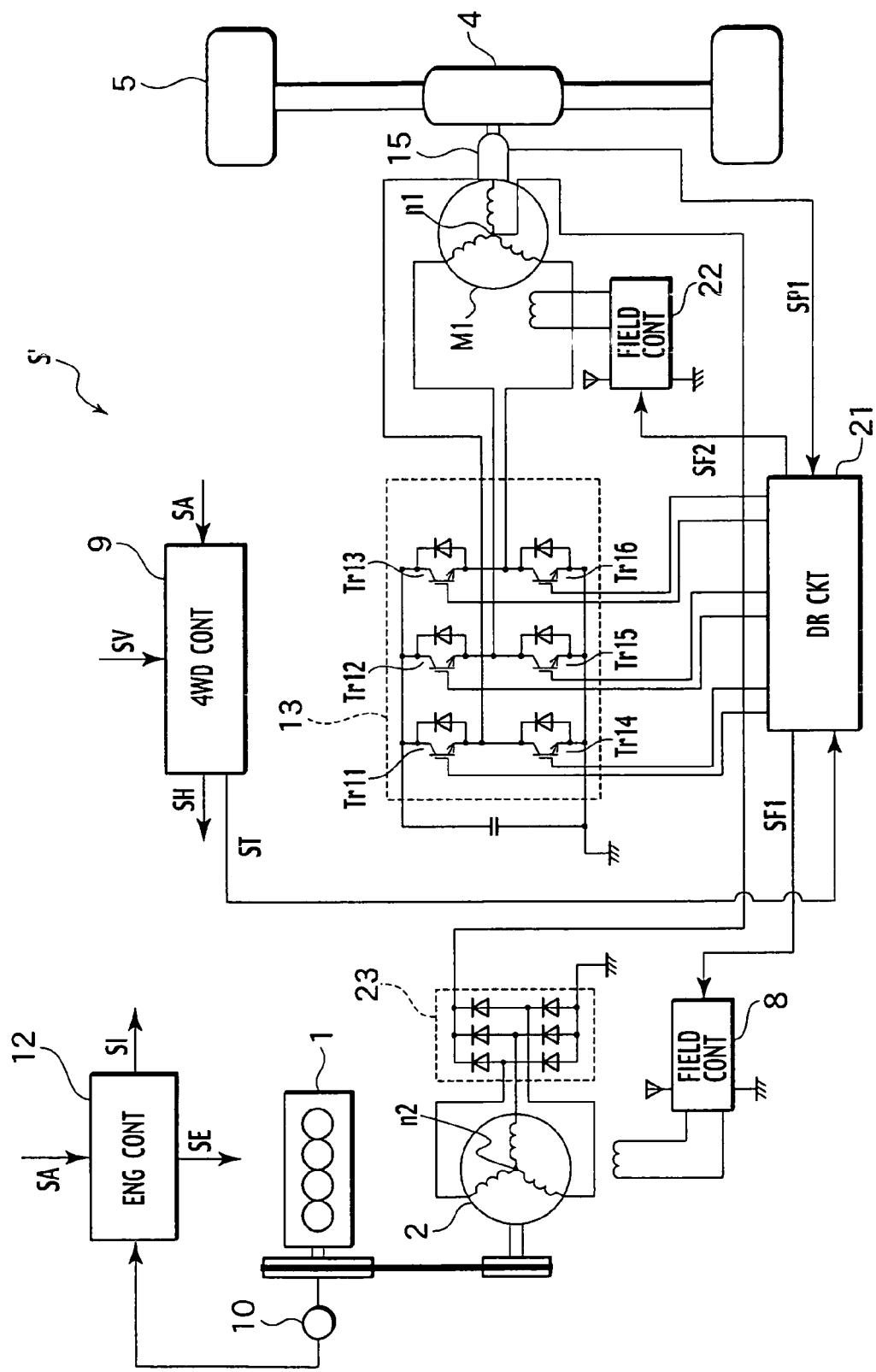
FIG. 6 is a block diagram illustrating a structure of a control device for a motor-driven four wheel drive vehicle of a second embodiment according to the present invention.

FIG. 6 is a block diagram illustrating a structure a control device S' of a motor-driven four wheel drive vehicle of the presently filed embodiment.

As shown in FIG. 6, like in the first embodiment, the control device S' of the presently filed embodiment is comprised of the engine 1, the 42V alternator 2, the three-phase AC motor M1, the engine speed sensor 10, the rear step-up and step-down inverter (the first step-up and step-down inverter) 13 and the four wheel drive controller 9 but principally differs from the first embodiment in the absence of the front step-up and step-down inverter (the second step-up and step-down inverter) 3.

Additionally, the control device S' of the presently filed embodiment further includes a diode bridge circuit 23, which rectifies three-phase AC power generated by the 42V alternator 2, whose output terminals have a positive terminal that is connected to a neutral point n1 of the three-phase motor M1. Moreover, the control device S' includes a driver circuit 21 that outputs the command signal SF1 to the field controller 8 in dependence on the torque command signal ST outputted from the 4WD controller 9 while outputting the command signal SF2 to the field controller 22 for controlling current for field of the three-phase AC motor M1 while outputting the ON/OFF signals to the control input terminals of the respective switching elements Tr11 to Tr16 of the rear set-up and set-down inverter 13.

Hereinafter, description is made of a basic sequence of operations, to be executed during operations in four wheel drive mode, of the control device for the motor-driven four wheel drive vehicle of the presently filed embodiment. Incidentally, it will be appreciated that the operations of the 42V alternator 2, the rear step-up and step-down inverter 13 and the three-phase AC motor M1 in four wheel drive mode are summarized as shown in FIG. 7.

Operations in Four Wheel Drive Mode

If the four wheel drive controller 9 discriminates in response to the output signal SV of the vehicle wheel sensor and the output signal SA of the accel sensor that four wheel drive control is to be performed, the four wheel drive controller 9 delivers the torque command signal ST to the driver circuit 21.

This allows the driver circuit 21 to deliver the command signal SF1 to the field controller 8, thereby exciting the field winding of the 42V alternator 2. This causes the 42V alternator 2, which rotates with rotational power of the engine 1, to serve as the electric power generator, like in the first embodiment. Output power resulting from the 42V alternator 2 due to its power generation is rectified by the diode bridge circuit 23 and supplied to the neutral point n1 of the three-phase AC motor M1.

Under such a condition, the driver circuit 21 delivers the command signal SF2 to the field controller 22 to keep the field winding of the three-phase AC motor M1 in an excited condition and, additionally, delivers the ON/OFF control signals to the control input terminals of the switching elements Tr11 to Tr16 of the rear step-up and step-down inverter 13 to control the switching elements Tr11 to Tr16 for converting DC power, outputted from the diode bridge circuit 23, into three-phase AC power at a desired voltage level which in turn is supplied to the three-phase AC motor M1.

As a result, the three-phase AC motor M1 is rotationally driven with rotational power being transferred to the rear wheels 5, realizing four wheel drive for the rear wheels 5 to be rotationally driven. That is, in cyclopaedically summarizing, the 42V alternator (ALT) is caused to operate as the electric power generator (ALT) when the operating mode (MODE) lies in the four wheel drive mode as shown in FIG. 7. When this takes place, the rear step-up and step-down inverter (RR INV) operates in the power running mode (PWR) to drivingly operate (DR) the three-phase AC (MOT) motor. Under such operation (OPERATION), the 42V alternator 2 generates electric power (GENERATE WITH ALT) while the rear step-up and step-down inverter operates the three-phase AC motor (DRIVE MOT WITH RR INV).

As mentioned above, with the control device of the motor-driven four wheel drive vehicle, due to an ability of using electric power generated by the 42V-alternator 2 for the three-phase AC motor M1 driven with three-phase AC power at 42 volts and the 14V battery E1 charged by DC power at 14 volts, no separate electric power generators need to be provided for respective purposes, enabling a device structure to be simplified. Also, space saving for minimizing installation space for the device can be achieved, enabling reduction in weight and costs.

Further, since AC power generated by the 42V alternator 2 can be converted to DC power upon which DC power is stepped up by the rear step-up and step-down inverter 13 to rotationally drive the three-phase AC motor M1 for driving the rear wheels 5, the voltage to be supplied to the three-phase AC motor M1 can be raised to a higher level than that generated by the 42V alternator 2, enabling the three-phase AC motor M1 to be miniaturized and lightweight.

Furthermore, due to the use of the diode bridge circuit 23 as the rectifying mechanism for rectifying three-phase AC power generated by the 42V alternator 2, the rectifying mechanism can be simplified in structure, thereby enabling the device structure to be minimized and lightweight while enabling reduction in costs.

That is, since the diode bridge circuit can be used as the rectifying mechanism for rectifying AC power generated by the electric power generator, thereby enabling a device scale to be minimized and lightweight while enabling reduction in costs.

The entire content of a Patent Application No. TOKUGAN 2003-397304 with a filing date of Nov. 27, 2003 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A control device for controlling a motor-driven four wheel drive vehicle where either of front wheels and rear wheels are driven by an engine and the others are driven by an AC motor, comprising:
   an electric power generator adapted to be driven by an engine to generate first three-phase AC power;
   a rectifier adapted to rectify the first three-phase AC power that is generated by the electric power generator to produce second DC power and to supply the second DC power to a neutral point of the AC motor; and
   a first step-up and step-down inverter adapted to step up and convert the second DC power that is supplied through the neutral point to produce third three-phase AC power, the AC motor being adapted to be rotationally driven by application of the third three-phase AC power from the first step-up and step-down inverter.

2. The control device according to claim 1, wherein the rectifier includes a diode bridge circuit.

3. The control device according to claim 1, wherein the rectifier includes a second step-up and step-down inverter.

4. The control device according to claim 3, further comprising a battery connected to a neutral point of the electric power generator through a switch and having a rated voltage lower than a rated voltage of the electric power generator.

5. The control device according to claim 4, wherein during start-up of the engine, the switch is closed to allow fourth DC power that is discharged by the battery and supplied through the neutral point of the electric power generator to be stepped up and converted to fifth AC power by the second step-up and step-down inverter while causing the electric power generator to serve as an electric motor to which the fifth AC power is supplied for starting up the engine.

6. The control device according to claim 4, wherein the second step-up and step-down inverter steps down and converts the first three-phase AC power that is generated by the electric power generator to produce sixth DC power to be charged to the battery.

7. The control device according to claim 3, wherein the second step-up and step-down inverter is subsequently connected to the electric power generator such that the second step-up and step-down inverter has a positive terminal connected to the neutral point of the AC motor and a negative terminal connected to a negative terminal of the first step-up and step-down inverter.

8. The control device according to claim 1, wherein an output terminal of the rectifier is connected to the neutral point of the AC motor, and wherein another output terminal of the rectifier is connected to the first step-up and step-down inverter.

9. The control device according to claim 1, wherein an output terminal of the rectifier is connected to the neutral point of the AC motor.

10. The control device according to claim 1, wherein an output terminal of the rectifier is connected to the first step-up and step-down inverter.

11. A control method controlling a motor-driven four wheel drive vehicle where either of front wheels and rear wheels are driven by an engine and the others are driven by an AC motor, comprising:
- generating first three-phase AC power utilizing rotational motion of an engine;
- rectifying the first three-phase AC power to second DC power;
- stepping up and converting the second DC power that is supplied through a neutral point of the AC motor to produce third three-phase AC power; and
- applying the third three-phase AC power to the AC motor to rotationally drive the AC motor.

12. A control device for controlling a motor-driven four wheel drive vehicle where either of front wheels and rear wheels are driven by an engine and the others are driven by an AC motor, comprising:
- an electric power generator adapted to be driven by an engine assembly including an engine controller responsive to an engine speed sensor to generate a first power that is three-phase AC;
- a rectifier adapted to rectify the first power that is generated by the electric power generator to produce a second power that is DC and to supply the second power directly to a neutral point of the AC motor; and
- a first step-up and step-down inverter adapted to step up and convert the second power that is supplied through the neutral point to produce a third power that is three-phase AC, the AC motor being adapted to be rotationally driven by application of the third power from the first step-up and step-down inverter.

13. The control device according to claim 12, wherein the first step-up and step-down inverter receives the second power directly from the neutral point.

\* \* \* \* \*